United States Patent [19]

Schwall

[11] 4,444,259
[45] Apr. 24, 1984

[54] APPARATUS AND METHOD FOR PURGING HYDROGEN SULFIDE GASES FROM WELL WATER

[76] Inventor: Joseph A. Schwall, 1450 Sanders Rd., Northbrook, Ill. 60062

[21] Appl. No.: 339,682

[22] Filed: Jan. 15, 1982

[51] Int. Cl.³ .................... E21B 43/00; E21B 43/34
[52] U.S. Cl. .................................. 166/265; 166/105; 166/371
[58] Field of Search ............... 166/265, 105.5, 105, 166/112, 68, 369, 371, 68; 417/435

[56] References Cited

U.S. PATENT DOCUMENTS

| | | | |
|---|---|---|---|
| 464,785 | 12/1891 | Barnhart | 166/112 |
| 806,559 | 12/1905 | McCollough | 166/112 |
| 2,118,176 | 5/1938 | Dunlap | 166/112 |
| 2,800,085 | 7/1957 | Hansen | 166/105.5 |
| 2,833,222 | 5/1958 | Hansen | 166/105.5 |
| 3,045,607 | 7/1962 | Lindner | 166/68 X |
| 3,048,122 | 8/1962 | Hansen | 166/105.5 |
| 3,519,073 | 7/1970 | Shetler | 166/265 X |

Primary Examiner—Stephen J. Novosad
Attorney, Agent, or Firm—Thomas R. Vigil

[57] ABSTRACT

An apparatus and method of ridding objectionable hydrogen sulfide gases from well water before pumping the water from the well is provided, wherein the water at the water table level in the well is aerated, causing turbulence in the well water, and facilitating the escape of hydrogen sulfide gases to the atmosphere.

The apparatus (10) for ridding hydrogen sulfide gases from well water comprises means (16) for pumping well water (19) under pressure to a water delivery system of an edifice (30, 33), additional means (38) associated with the pumping means (16) for delivering a relatively small portion of the well water under pressure to the well water (19) in the well (12) to cause turbulence in the water to facilitate the escape of hydrogen sulfide gases from the well water, and further means (13) to vent the freed hydrogen sulfide gases to the atmosphere.

The process for carrying out the invention comprises the steps of: pumping water under pressure from a well to a water delivery system, delivering a relatively small portion of water under pressure to the surface of the water in the well, causing turbulence in the well water to facilitate release of hydrogen sulfide gases from the well water, and venting the released hydrogen sulfide gases to the atmosphere.

15 Claims, 5 Drawing Figures

U.S. Patent     Apr. 24, 1984     4,444,259
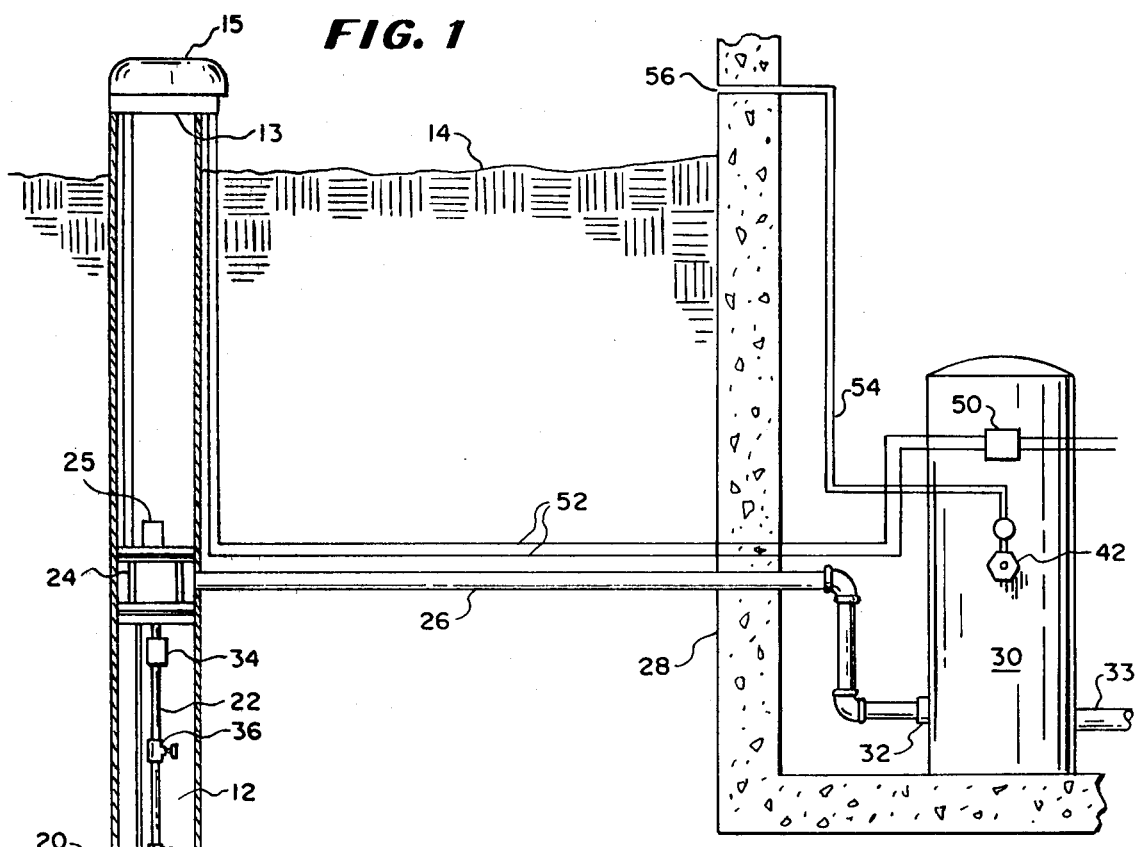
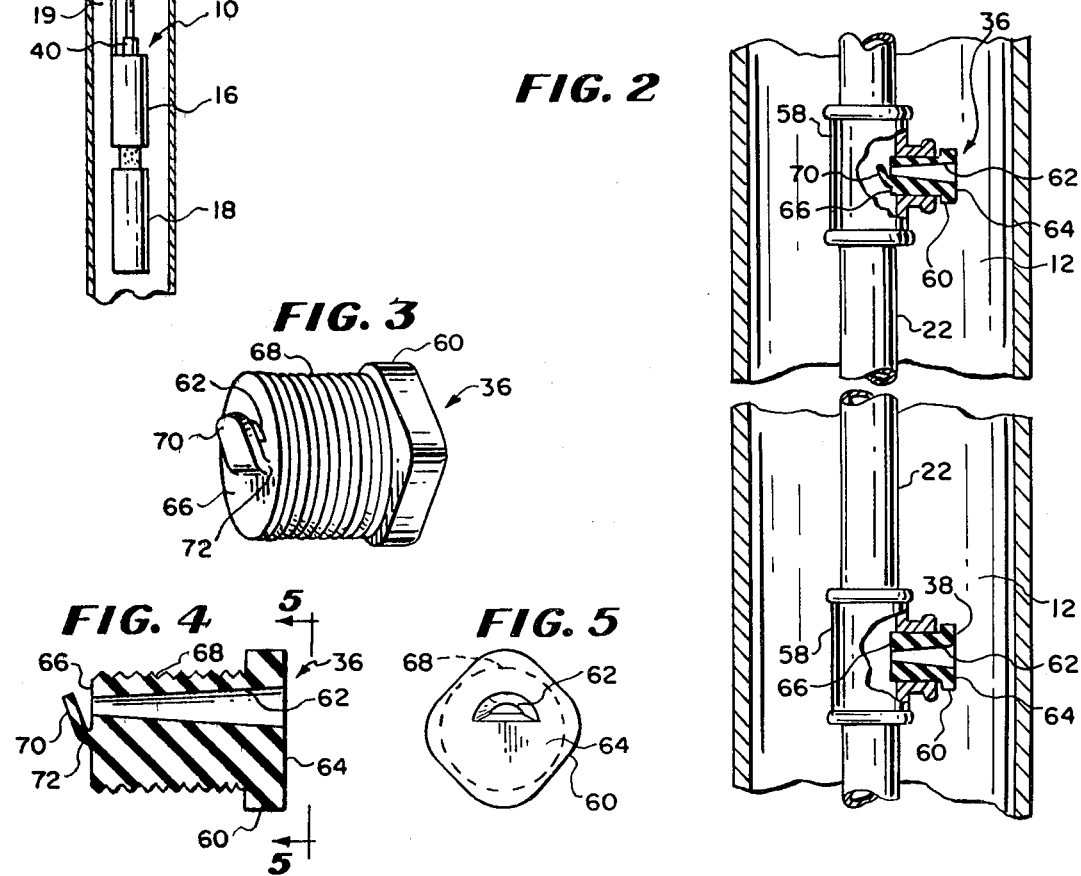

APPARATUS AND METHOD FOR PURGING HYDROGEN SULFIDE GASES FROM WELL WATER

TECHNICAL FIELD

The present invention relates to an apparatus and method of purging hydrogen sulfide gases from well water. More specifically, the present invention relates to a novel method for utilizing a modified well pumping system to aerate the well water causing turbulence which facilitates the escape of the hydrogen sulfide gas in the water. The water then pumped from the well is substantially free of objectionable hydrogen sulfide gas.

BACKGROUND ART

In many areas of the country, water is provided to homes and commercial and industrial facilities by means of pumping water from underground wells. Underground water contains several objectionable impurities, the primary one being hydrogen sulfide gas, which produces an unpleasant odor akin to rotten eggs. The water conditioning industry has developed conditioning units and filters in an attempt to alleviate this problem, but these prior devices have all been costly and complicated to operate and maintain. Some such units do not even produce the water quality desired.

By way of example, one of America's leading water conditioning equipment manufacturers has marketed a chemical treatment system for purifying well water and ridding the well water of hydrogen sulfide gases which system uses charged salts to treat the water. This system does not aerate the well water, and besides being relatively expensive and complicated to install and operate, requires frequent maintenance to recharge the salts.

As will be described in greater detail hereinafter, the apparatus and method of the present invention is directed to producing an aeration or turbulence in well water during the pumping process to facilitate the purging of undesirable gaseous substances, such as hydrogen sulfide gas, from the water being pumped, and thus substantially purify the well water prior to delivery for uses such as drinking, bathing, food preparation and the like.

DISCLOSURE OF THE INVENTION

The present invention provides an inexpensive and efficient method of aerating the water pumped from wells in a water well pump system to create turbulence in the water at the water table, thereby to facilitate the escape of hydrogen sulfide gas to atmosphere, and in this way rid the water of its objectionable odor. As will be described in greater detail hereinafter, this objective is accomplished by installing an aerator device on a submersible water pump system which is used to pump water from a well.

More specifically, a bleeder is provided in a submersible water pump system, whereby small amounts of water under pressure are allowed to escape above the water level in the well from a pipe carrying the pressurized water to a water delivery system in a building, such as a home or commercial, industrial or other facility. The escaping spray of water aerates the water in the well, causing turbulence in the water at the water table level, which facilitates the escape of the gaseous hydrogen sulfide to the atmosphere.

According to the invention, there is provided an apparatus for purging well water of hydrogen sulfide gases comprising means including a delivery conduit in a well for pumping the well water under pressure from an underground source of water to a water delivery system of an edifice, a constantly open bleeder opening in said conduit at about the height of the surface of the well water in said well for delivering a relatively small portion of the well water under pressure to, at and into the surface of the well water in said well to cause turbulence in the well water to facilitate purging of hydrogen sulfide gases from the well water, and means for venting the freed hydrogen sulfide gases to the atmosphere.

The opening is typically realized by an aperture in a bleeder valve plug fitting received in a side opening in a T-fitting or coupling mounted in a drop pipe forming the conduit in the well pumping means.

Further, according to the invention, there is provided a method of purging hydrogen sulfide gases from well water comprising the steps of pumping water under pressure from the well to a water delivery system, delivering a relatively small portion of water under pressure to the surface of the water in the well, causing turbulence in the well water to facilitate release of hydrogen sulfide gases from the well water, and venting the released hydrogen sulfide gases to the atmosphere.

BRIEF DESCRIPTION OF DRAWINGS

FIG. 1 is a schematic diagram of a submersible water pump system used to deliver water from an underground well to a facility such as a house;

FIG. 2 is an elevated fragmentary vertical section view of a portion of the pump drop pipe shown in FIG. 1, and shows details of two drain fittings or bleeders installed in the pipe;

FIG. 3 is a detailed perspective view of the lower drain fitting shown in FIG. 2;

FIG. 4 is a vertical sectional view of the drain fitting shown in FIG. 3; and

FIG. 5 is an end view of the drain fitting illustrated in FIG. 4, and is taken along line 5—5 of FIG. 4.

BEST MODE FOR CARRYING OUT THE INVENTION

Referring now to FIG. 1, there is illustrated therein a submersible water pump system which is generally designated by reference numeral 10. The system is monitored in a well 12 extending below ground level 14. As shown, the well 12 includes a vent section 13 which extends above ground level 14 and includes a vented cap 15. The water pump system 10 comprises a pump unit 16 driven by an electrical motor 18, both of which are submersed in water 19, below the water table level 20. A pump drop pipe 22 extends from pump unit 16 along the axis of well 12 to a pitless adapter 24. The space below adapter 24 is vented through the adapter in a conventional manner and through a pipe 25 to the vent section 13. A water pipe 26 extends from pitless adapter 24 through the foundation wall 28 of an ediface such as a home or other structure, and is connected to pressure tank 30 at junction 32. Pressure tank 30 comprises either a captive air bag, a permanent air cushion, or an air charger apparatus.

Service pipe 33 carries the water to the plumbing system of the house. In the context of the present invention, pressure tank 30 must be connected to an air charger system. This air charger apparatus includes a poppet-type line check valve 34, drain fittings or bleeder valves 36, 38, a pump check valve 40, and an air volume control 42 on pressure tank 30. Line check valve 34 is disposed in pump drop pipe 22 at a point just below pitless adapter 24. By way of example, but not of limitation, bleeder/fitting 36 is located approximately ten feet down pump drop pipe 22, and bleeder/fitting 38 is located at approximately twenty-one feet down the pump drop pipe 22. As shown, pump check valve 40 is disposed adjacent pump unit 16.

An electrical pressure switch 50 is fixed to pressure tank 30, and is connected by means of electrical cable 52 to motor 18 to initiate operation of pump 16 upon generation of a signal from pressure switch 50. The air volume control 42 includes a vent line 54 for venting gases from the pressure tank 30 to the atmosphere.

Bleeder valves 36, 38 are composed of rubber or other suitable material, and are installed in pump drop pipe 22 by any suitable means, such as by means of one inch standard pipe tees 58, as shown more clearly in FIG. 2. Each bleeder valve 36, 38, as viewed in FIGS. 3-5, include a flanged portion 60 which extends into the space between the wall of well 12 and pump drop pipe 22. A tapered aperture 62 extends longitudinally through the body of each bleeder valve, and extends between a first face 64 and a second face 66 of the bleeder valve. Threads 68 are provided on the circumference of each bleeder valve 36, 38 to facilitate installation into pipe tees 58, which contain mating threads.

Bleeder valve 36 includes a movable closure flap 70 affixed to face 66 by means of a living hinge 72 (FIGS. 3,4) or other suitable means allowing flap 70 to pivot alternately to open or close aperature 62. An important aspect of the invention is that bleeder valve 38 does not include a closure flap 70, and aperture 62 of this bleeder valve is always open, for purposes to be explained.

To better understand the operation of the above-described system, assume initially that bleeder valve 38 is constructed the same as bleeder valve 36, and includes a movable closure flap 70 attached to face 66 to alternately open and close aperture 62. This type of system is commonly used in submerged pump well systems today, and the present invention is an improvement over such systems. With the aforementioned assumed construction, when pump 16 is actuated and operating, closure flaps 70 on each bleeder valve 36 are held closely against face 66 (FIG. 4) by the pressure of the water being pumped up drop pipe 22. Thus, apertures 62 are closed by the flaps 70, preventing all but an insignificant leakage loss of water from the system. Simultaneously, line check valve 34 is opened by the flow of water up drop pipe 22.

When pressure switch 50 on tank 30 sends a signal through cable 52 to stop the pump 16, line check valve 34 automatically closes, holding the water in line 26 and tank 30. At the same time, pump check valve 40 closes, and holds the water in pump 16 and in the drop pipe up to the position of the lower bleeder valve 38. Flapper valves 70 leak enough water to relieve the pressure between valve 36 and valve 38, and to drain some water back into the well through apertures 62. At this juncture, air is drawn into drop pipe 22 through bleeder valve 36 to replace the water that has leaked out. The next time the pump 16 starts, the air slug between bleeder valves 36 and 38 is driven into pressure tank 30, where it is compressed by the pressurized water delivered by the pump 16. Air volume control 42 on the tank vents any excess air charged into the tank through vent line 54.

In accordance with the teachings of the present invention, the structure of bleeder valve 38 has been modified as described above, wherein flapper valve 70 has been removed from face 66 of the bleeder valve, thereby maintaining aperture 62 in the lower bleeder valve 38 permanently open. Due to the water pressure generated by pump 16, water escapes from bleeder valve 38 through aperture 62, and the water escaping from the bleeder valve 38 is sprayed against the side of the well 12, and then onto the surface of the water in the well. This spraying action aerates the water, and creates a turbulence in the water in the well causing the hydrogen sulfide gas in the water to "bubble" free of the water and rise to the top of the well where it is vented to atmosphere through vent 13. Additionally, air volume control 42 on tank 30 also vents some of the residual gases that may accumulate in the tank. Thus, the water that is fed through water pipe 26 into tank 30 is substantially free of hydrogen sulfide gases due to the turbulence created in the water in the well 12.

It is apparent from the foregoing description that the apparatus and method of the present invention to rid well water of hydrogen sulfide gases provide a number of advantages, some of which have been described, and others of which are inherent in the invention.

Also, it is apparent that modifications can be made to the apparatus and method of the present invention without departing from the teachings thereof. Accordingly, the scope of the invention is only to be limited as necessitated by the accompanying claims.

I claim:

1. An apparatus for purging well water of hydrogen sulfide gases comprising:
    (a) means including a delivery conduit in a well for pumping the well water under pressure from an underground source of water to a water delivery system of an edifice;
    (b) a constantly open bleeder opening in said conduit at about the height of the surface of the well water in said well for delivering a relatively small portion of the well water under pressure to, at and into the surface of the well water in said well to cause turbulence in the well water to facilitate purging of hydrogen sulfide gases from the well water; and
    (c) means for venting the freed hydrogen sulfide gases to the atmosphere.

2. The apparatus of claim 1 wherein said conduit includes a pipe extending between a water pump disposed beneath the level of water in said well and the water delivery system, and said bleeder opening comprises an aperture in said pipe to enable said small portion of water under pressure to be delivered to the surface of the well water in said well.

3. The apparatus of claim 2 wherein said pipe includes a portion thereof extending from said pumping means through the water level and along a portion of the length of said well above the water level, and operatively connected to said water delivery system, and said aperture is disposed in said pipe at a location above the water level, whereby said small portion of water under pressure is transmitted from said pipe through said aperture, against the side of the well and then onto the surface of said water in said well to produce turbulence in the water in said well.

4. The apparatus of claim 3 wherein said water delivery system includes a pressure tank operably connected to said pipe for storing water under pressure and transmitting the water under pressure upon demand to said water delivery system.

5. The apparatus of claim 3 wherein said drop pipe has a T-fitting with a side opening, a plug fitting received in said side opening of said T-fitting, and said plug fitting having said aperture therethrough for bleeding pressurized water from said drop pipe into said well pipe at about the level of water in said well pipe.

6. The apparatus of claim 5 wherein said plug fitting is made of an elastomeric material and said aperture therein tapers outwardly from a small opening at the inner surface of said plug fitting to a larger outer opening of said plug fitting facing the wall of said well pipe.

7. An apparatus for pumping water from below the water level of an underground well to a water delivery system forming part of an edifice, wherein the water is substantially free of hydrogen sulfide gases when transmitted to said delivery system, comprising:
   a. a well;
   b. submersible and selectively operable pumping means disposed in said well and below the water level;
   c. a pressure tank for storing water under pressure and for transmitting the stored water to said delivery system;
   d. a delivery pipe connected between said pumping means and said pressure tank for transmitting water from said well to said pressure tank when said pumping means is actuated;
   e. said pumping means including a drop pipe extending along a portion of the length of said well, and having a portion thereof extending above the water level;
   f. means for bleeding water from said drop pipe including an opening in said drop pipe for permitting a relatively small amount of water pumped under pressure by said pumping means through said drop pipe to be sprayed from said drop pipe back into said well at or about the surface of the water level in said well, whereby said spray causes turbulence in the water at and below the water level, thereby freeing hydrogen sulfide gases into the portion of said well above the water level to substantially remove said hydrogen sulfide gases from the water, and
   g. vent means associated with said well to vent the hydrogen sulfide gases to atmosphere.

8. The apparatus of claim 7 wherein said opening comprises a relatively small aperture extending through the wall of said drop pipe and into said well just above the water level in said well, said aperture being permanently open to allow a spray of water to escape from said drop pipe into said well when said pump is operating, and permitting air to enter said drop pipe when said pump is not operating.

9. The apparatus of claim 8 wherein said drop pipe has a T-fitting with a side opening, a plug fitting received in said side opening of said T-fitting, and said plug fitting having said aperture therethrough for bleeding pressurized water from said drop pipe into said well pipe at about the level of water in said well pipe.

10. The apparatus of claim 9 wherein said plug fitting is made of an elastomeric material and said aperture therein tapers outwardly for a small opening at the inner surface of said plug fitting to a larger outer opening of said plug fitting facing the wall of said well pipe.

11. The apparatus of claim 7 wherein said bleeding means includes a second relatively small aperture extending through the wall of said drop pipe and opening into said well, said second aperture being located in said drop pipe at a distance above said first aperture relative to the water level, said second aperture having closure means associated therewith operable to close said aperture when water is being pumped under pressure through said drop pipe, and to open said aperture when said pump is not operating.

12. The method of purging hydrogen sulphide gases from well water comprising the steps of:
   (a) pumping water under pressure from said well to a water delivery system;
   (b) delivering a relatively small portion of said water under pressure to the surface of the water in said well, causing turbulence in the well water to facilitate release of hydrogen sulfide gases from the well water; and
   (c) venting said released hydrogen sulfide gases to the atmosphere.

13. The method of purging hydrogen sulfide gases from well water comprising the steps of:
   (a) pumping the water under pressure from said well through a pipe system partially disposed in said well to a water delivery system in an edifice;
   (b) permitting a relatively small portion of the water under pressure in said pipe system to escape from said pipe system at a location above the level of the water in said well, whereby the escaping water is sprayed onto the water in said well, causing turbulence in the water thereby to purge said hydrogen sulfide gases from the water; and
   (c) venting said escaping hydrogen sulfide gases to atmosphere.

14. The method of claim 13 wherein said step of permitting a relatively small portion of said water under pressure in said pipe system to escape includes the additional step of providing a permanent relatively small vent opening in said pipe system just above the level of water in said well.

15. In a well water pumping system including a well pipe and a smaller diameter drop pipe in said well pipe, the improvement residing in a bleeder valve fitting having a permanently open aperture therethrough and being mountable in a T-fitting in said drop pipe to allow a small portion of water to escape from the drop pipe against the well pipe at the level of water in the well so as to cause turbulence in the surface of the water level in the well pipe to purge hydrogen sulfide gases therefrom.

* * * * *